(12) United States Patent
Liu

(10) Patent No.: US 11,866,156 B1
(45) Date of Patent: Jan. 9, 2024

(54) APPARATUS FOR VORTEX GENERATION TO IMPROVE AERODYNAMICS

(71) Applicant: Wei Liu, Arlington, TN (US)

(72) Inventor: Wei Liu, Arlington, TN (US)

( * ) Notice: Subject to any disclaimer, the term of this patent is extended or adjusted under 35 U.S.C. 154(b) by 0 days.

(21) Appl. No.: 17/531,766

(22) Filed: Nov. 21, 2021

(51) Int. Cl.
*B64C 23/06* (2006.01)
*B64C 21/10* (2006.01)

(52) U.S. Cl.
CPC ............ *B64C 23/065* (2013.01); *B64C 21/10* (2013.01)

(58) Field of Classification Search
CPC ........ B64C 23/06; B64C 23/065; B64C 21/10
See application file for complete search history.

(56) References Cited

U.S. PATENT DOCUMENTS

| | | | |
|---|---|---|---|
| 2,894,703 A | | 7/1959 | Hazen et al. |
| 4,360,176 A | | 11/1982 | Brown |
| 5,209,438 A | | 5/1993 | Wygnanski |
| 5,253,828 A | * | 10/1993 | Cox ........................ B64C 23/06 244/214 |
| 5,326,050 A | | 7/1994 | Zell |
| 6,131,853 A | * | 10/2000 | Bauer ...................... F42B 10/62 482/13 |
| 6,220,550 B1 | | 4/2001 | McKillip, Jr. |
| 7,410,133 B2 | | 8/2008 | Lee et al. |
| 11,736,227 B1 | * | 8/2023 | Wu ........................ H04L 1/0033 370/338 |
| 2007/0102587 A1 | | 5/2007 | Jones et al. |
| 2009/0020652 A1 | * | 1/2009 | Rincker .................. B64C 23/06 244/204 |
| 2016/0083083 A1 | * | 3/2016 | Bordoley ................ B64C 23/06 244/200.1 |
| 2017/0137116 A1 | * | 5/2017 | Ireland .................... B64C 23/06 |
| 2019/0315459 A1 | * | 10/2019 | Langenbacher ........ B64C 21/08 |

FOREIGN PATENT DOCUMENTS

| | | |
|---|---|---|
| DE | 602004001725 T2 | 8/2007 |
| DE | 102008022504 A1 | 11/2012 |
| IL | 121164 A | 3/2002 |

OTHER PUBLICATIONS wikipedia.org, "Leading-edge slat", https://en.wikipedia.org/wiki/Leading-edge_slat.
wikipedia.org, "Vortex generator", https://en.wikipedia.org/wiki/Vortex_generator.
Federal Aviation Administration, "Glider Handbook", Chapter 3, p. 5. https://www.faa.gov/regulations_policies/handbooks_manuals/aviation/glider_handbook/media/gfh_ch03.pdf.
Micro Aerodynamics Inc, "Micro Vortex Generators", https://microaero.com/.
Ballade Sports, "Ballade Sports Turbulator Tape", https://balladesports.com/products/ballade-sports-turbulator-aero-strip.
wikipedia.org, "Flap (aeronautics)", https://en.wikipedia.org/wiki/Flap_(aeronautics).
Steve Parker, Peter Lafferty, and Steve Setford, "How Things Work", 2000, pp. 20-21, Backpack Books, New York, NY, USA.

* cited by examiner

*Primary Examiner* — Tye William Abell

(57) ABSTRACT

This invention is an apparatus for vortex generation by combining the function of means for vortex generation with the functions of the leading-edge aerodynamic surface, the airfoil, and/or the trailing-edge aerodynamic surface.

12 Claims, 5 Drawing Sheets

APPARATUS FOR VORTEX GENERATION
TO IMPROVE AERODYNAMICS

CROSS-REFERENCE TO RELATED
APPLICATIONS

None

STATEMENT REGARDING FEDERALLY
SPONSORED RESEARCH OR DEVELOPMENT

This is solely my personal invention and is not made with or related to any federal funding.

REFERENCE TO A "SEQUENCE LISTING"

None

BACKGROUND OF THE INVENTION

In pursuit of the best possible aerodynamic performance, various devices, such as leading-edge slat, flap, and vortex generators, have been attempted and tried.

Leading-edge slats and flaps were invented over 100 years ago, and have been widely used ever since. Different configurations and variants of leading-edge slats and flaps have also been developed and implemented. Nowadays, leading-edge slats and flaps are employed on virtually all military airplanes and passenger airliners.

Vortex generators were invented many decades ago and have been commonly used on low-speed full-sized airplanes and gliders. They have also been used on radio-controlled airplanes to prevent or delay stall, improve take-off and landing performance, etc. Moreover, vortex generators have also been used on high-performance cars. In fact, vortex generators, in the form of turbulator tapes, are available for any motor vehicles, including minivans.

Various types of vortex generators are capable of offering special utilities in their respective applications and function well as intended. Nevertheless, they have limitations and disadvantages. For instance, vortex generators in the form of vanes are not retractable and suffer from one disadvantage, which is that they increase drag consistently, thus rendering them most suitable for low-speed full-sized airplanes and radio-controlled airplanes. Limited efforts have been made to create deployable vortex generator. A patent (Patent: U.S. Pat. No. 5,326,050A) has been granted for aerodynamic surface distension system for high angle of attack forebody vortex control. But said aerodynamic surface distension system is intended solely for control purposes and requires a dedicated control mechanism for deployment and operation. It can be seen easily that said vortex generators are not linked to or function in unison with other aerodynamic devices, such as the leading-edge slats or flaps, in order to achieve the highest possible effectiveness under various conditions. In the field of automotive, vortex generators are essentially "stand-alone non-adjustable" devices, whose parameters cannot be adjusted according to the driving conditions. An illustrative example is the vortex generators positioned at the rear of Honda Civic Type R.

BRIEF SUMMARY OF THE INVENTION

This invention is an apparatus for vortex generation by combining the function of means for vortex generation with the functions of the leading-edge aerodynamic surface, the airfoil, and/or the trailing-edge aerodynamic surface.

DETAILED DESCRIPTION OF THE
INVENTION

It is important to note that, in this "Detailed Description of the Invention" section and in the claims listed below, the term "airfoil" includes any object that has a predetermined shape and, when moving through gas or air in particular for this invention, is capable of generating aerodynamic force. It follows that wings of all types and configurations are naturally included in this definition of airfoil. Furthermore, in this "Detailed Description of the Invention" section and in the claims listed below, the term "leading-edge aerodynamic surface" includes any aerodynamic surface that is located approximately near the front of an airfoil, one example of which is the leading-edge slat; and similarly, the term "trailing-edge aerodynamic surface" includes any aerodynamic surface that is located approximately near the rear of said airfoil, one example of which is flap. Additionally, the term "means for vortex generation" that is used in this "Detailed Description of the Invention" section and in said claims listed below includes, but is not limited to, the realm of "turbulator" as well as the realm of "vortex generator." As Ballade Sports (a manufacturer of turbulators) puts it skillfully, "the turbulator acts as a small vortex generator . . . " As such, there is no difference in nature between a vortex generator and a turbulator as used in this "Detailed Description of the Invention" section. The term "vehicle" as used in this "Detailed Description of the Invention" section includes vehicles of any type, be it airborne vehicles, land-based vehicles, ocean-going vehicles, or a combination thereof.

Figure 1:
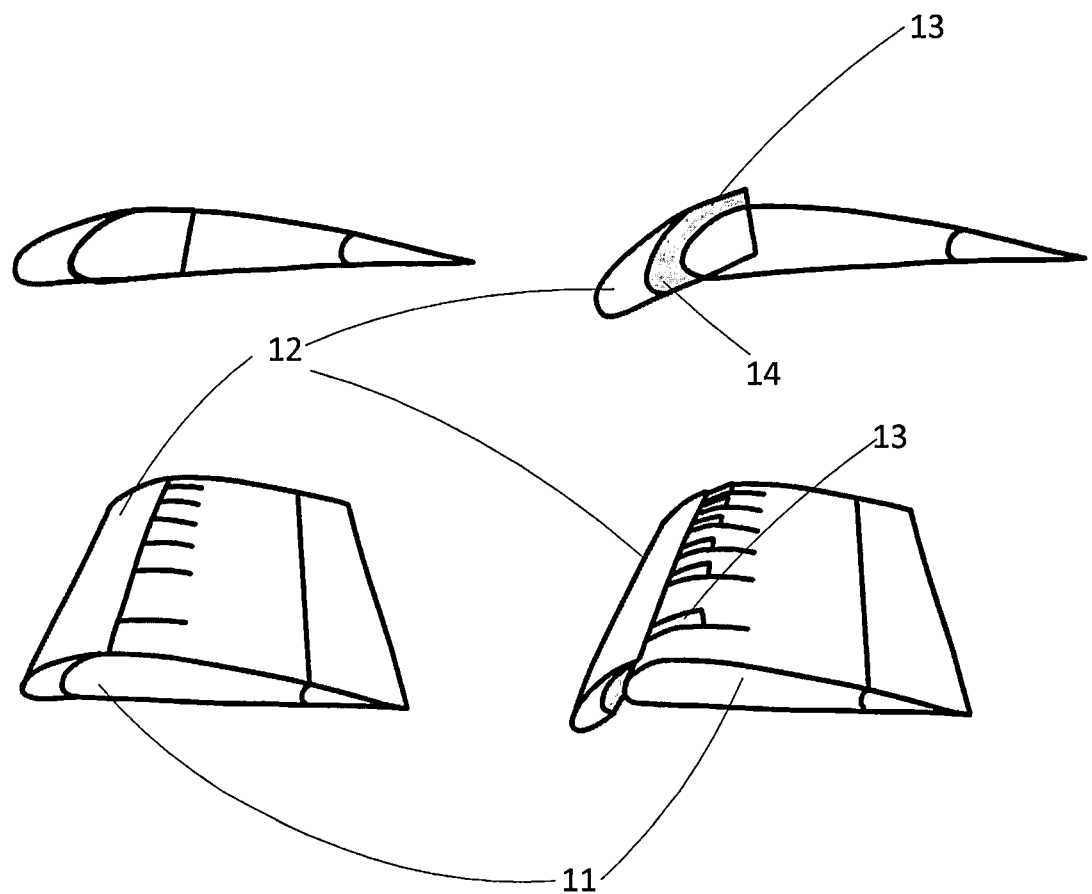
FIG. 1 shows a scheme of leading-edge aerodynamic surface means for vortex generation.
Figure 2:
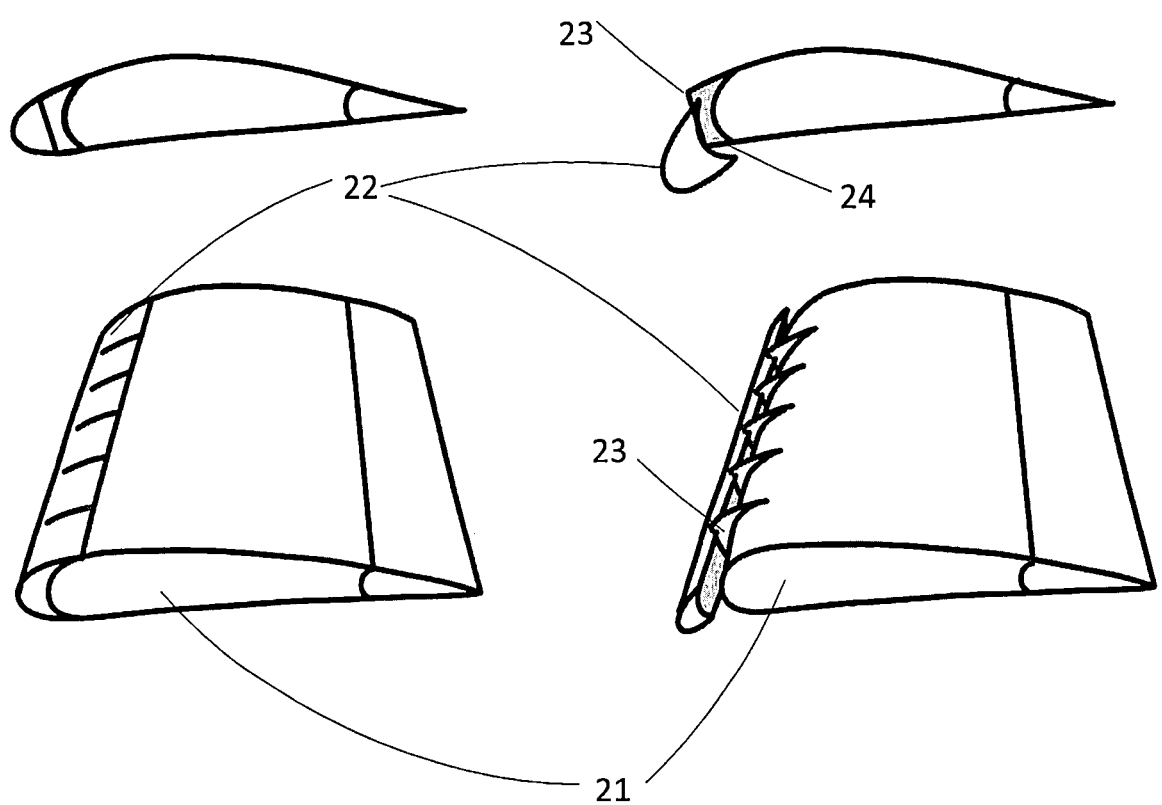
FIG. 2 illustrates a scheme of front airfoil means for vortex generation.
Figure 3:
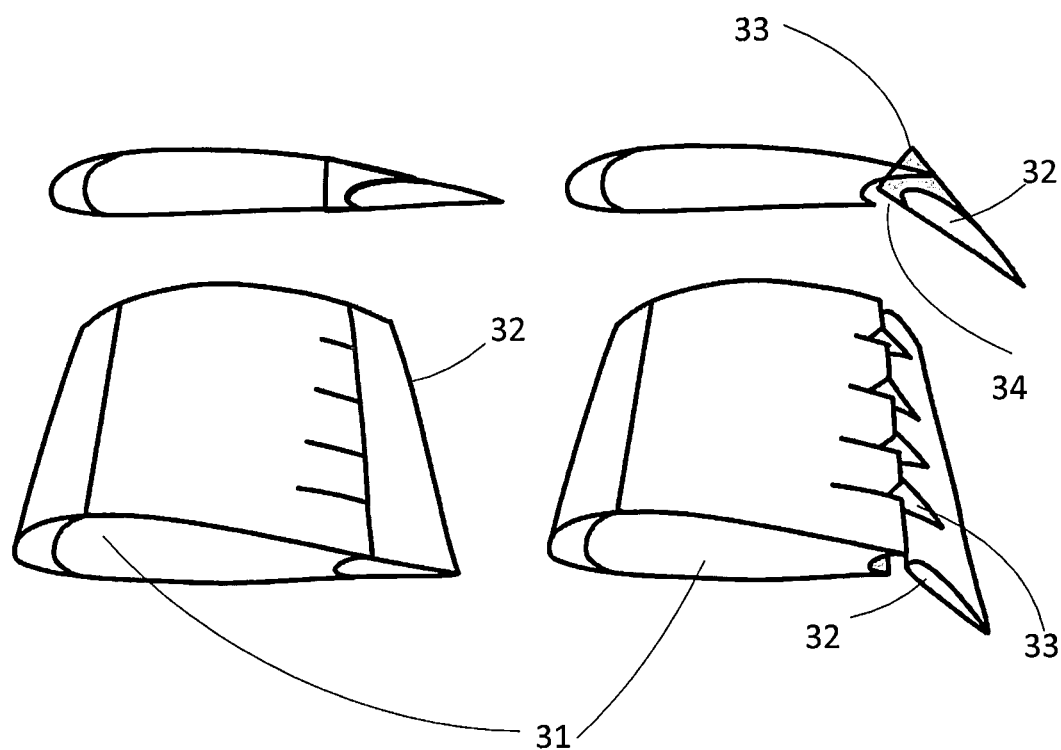
FIG. 3 demonstrates a scheme of trailing-edge aerodynamic surface means for vortex generation.
Figure 4:
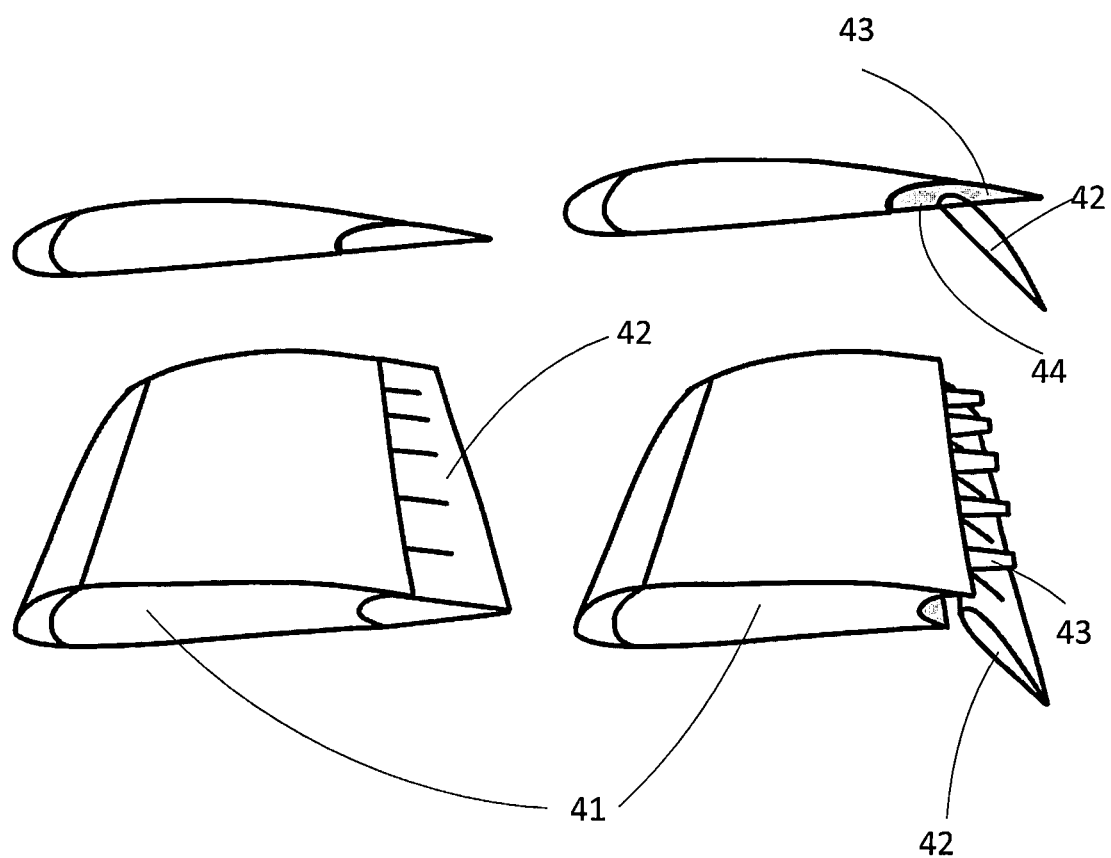
FIG. 4 shows a scheme of rear airfoil means for vortex generation.
Figure 5:
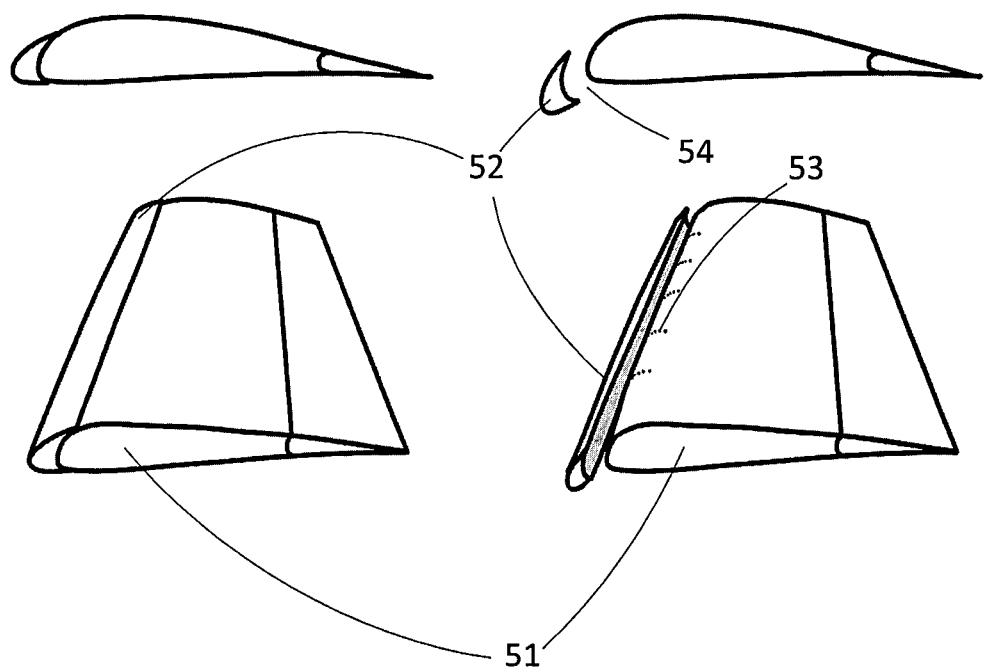
FIG. 5 is a scheme of air ejection nozzles as means for vortex generation.

FIG. 1 shows an airfoil 11 (FIG. 1), a leading-edge aerodynamic surface 12 (FIG. 1), leading-edge aerodynamic surface means for vortex generation 13 (FIG. 1) that is an extended part of said leading-edge aerodynamic surface 12 (FIG. 1), and slot 14 (FIG. 1) between said leading-edge aerodynamic surface 12 (FIG. 1) and said airfoil 11 (FIG. 1). Said leading-edge aerodynamic surface 12 (FIG. 1) is shown in the retracted position and in the deployed position respectively. Said leading-edge aerodynamic surface means for vortex generation 13 (FIG. 1) is shown in the inoperative position and in the operative position respectively. FIG. 2 depicts an airfoil 21 (FIG. 2), a leading-edge aerodynamic surface 22 (FIG. 2), front airfoil means for vortex generation 23 (FIG. 2) that is an extended part of said airfoil 21 (FIG. 2), and slot 24 (FIG. 2) between said leading-edge aerodynamic surface 22 (FIG. 2) and said airfoil 21 (FIG. 2). Said leading-edge aerodynamic surface 22 (FIG. 2) is shown in the retracted position and in the deployed position respectively. Said front airfoil means for vortex generation 23 (FIG. 2) is shown in the inoperative position and in the operative position respectively. FIG. 3 illustrates an airfoil 31 (FIG. 3), a trailing-edge aerodynamic surface 32 (FIG. 3), trailing-edge aerodynamic surface means for vortex generation 33 (FIG. 3) that is an extended part of said trailing-edge aerodynamic surface 32 (FIG. 3), and slot 34 (FIG. 3) between said airfoil 31 (FIG. 3) and said trailing-edge aerodynamic surface 32 (FIG. 3). Said trailing-edge aerodynamic surface 32 (FIG. 3) is shown in the retracted position and in the deployed position respectively. Said trailing-edge aerodynamic surface means for vortex generation 33 (FIG. 3) is shown in the inoperative position and in the operative position respectively. FIG. 4 presents an airfoil 41 (FIG. 4), a trailing-edge aerodynamic surface 42 (FIG. 4), rear airfoil means for vortex generation 43 (FIG. 4) that is an extended part of said airfoil 41 (FIG. 4), and slot 44 (FIG. 4) between said airfoil 41 (FIG. 4) and said trailing-edge aerodynamic surface 42 (FIG. 4). Said trailing-edge aerodynamic surface 42 (FIG. 4) is shown in the retracted position and in the deployed position respectively. Said rear airfoil means for vortex generation 43 (FIG. 4) is shown in the inoperative position and in the operative position respectively. FIG. 5 displays an airfoil 51 (FIG. 5), leading-edge aerodynamic surface 52 (FIG. 5), front airfoil means for vortex generation 53 (FIG. 5) in the form of a plurality of air ejection nozzles arranged in a predetermined pattern on said airfoil 51 (FIG. 5), and slot 54 (FIG. 5) between said leading-edge aerodynamic surface 52 (FIG. 5) and said airfoil 51 (FIG. 5). Said leading-edge aerodynamic surface 52 (FIG. 5) is shown in the retracted position and in the deployed position respectively. Said front airfoil means for vortex generation 53 (FIG. 5) is shown in the inoperative/closed position and in the operative/open position respectively.

A variety of structures, including a mechanical structure, a pneumatic structure, semi-rigid structure, or a combination thereof, can be assumed by said leading-edge aerodynamic surface means for vortex generation 13 (FIG. 1), said front airfoil means for vortex generation 23 (FIG. 2) & 53 (FIG. 5), said trailing-edge aerodynamic surface means for vortex generation 33 (FIG. 3), and said rear airfoil means for vortex generation 43 (FIG. 4). Said mechanical structure may comprise one or a plurality of vanes with at least one predetermined shape, such as straight, curved, zig-zag, inverted wedge shape, etc. Said mechanical structure interrupts the smooth flow of incoming air and creates vortexes as a result. Said pneumatic structure may comprise one or a plurality of air ejection nozzles arranged in at least one predetermined pattern, with said air ejection nozzles forcefully ejecting airstreams that are channeled from air supply source or a higher-air pressure area of said airfoil, said leading-edge aerodynamic surface, said trailing-edge aerodynamic surface, or a combination thereof. Said airstreams from said air ejection nozzles constitute air "blades" that function to interrupt the smooth flow of said incoming air and to create vortexes in the process.

In terms of said mechanical structure's operation, said means for vortex generation is in the inoperative position and is thus shielded from said incoming air, when said leading-edge aerodynamic surface or said trailing-edge aerodynamic surface is retracted. However, said means for vortex generation is "exposed" to said incoming air and thus becomes operative when said leading-edge aerodynamic surface or said trailing-edge aerodynamic surface is deployed. Said leading-edge aerodynamic surface and said trailing-edge aerodynamic surface are coupled onto said airfoil and can be deployed, extended, or retracted via a controllable deployment mechanism that may be of mechanical, pneumatic, hydraulic, aerodynamic type, or a combination thereof. Needless to say, they can also be deployed, extended, or retracted automatically by the force of said incoming air acting on them, e.g., the aerodynamic force caused from predetermined airspeeds or a predetermined angle of attack which acts on said deployment mechanism, as exemplified in F-86 jet fighter.

In said pneumatic structure's operation, said air ejection nozzles are "covered up" (i.e., unexposed and inoperative) by said leading-edge aerodynamic surface or said trailing-edge aerodynamic surface when said leading-edge aerodynamic surface or said trailing-edge aerodynamic surface is retracted, and said air ejection nozzles "open up" (i.e., uncovered) and become operative (i.e., ejecting airstreams) when said leading-edge aerodynamic surface or said trailing-edge aerodynamic surface is deployed. Said air ejection nozzles can also be opened or closed automatically by air pressure differentials between their locations and said higher pressure area, such as via a spring-loaded valve that opens and closes at a predetermined air pressure differential. Also, it is important to note that said means for vortex generation depicted in FIG. 5 can be also applied approximately near the rear of said airfoil, on any leading-edge aerodynamic surfaces, e.g., slats, or on any trailing-edge aerodynamic surfaces, including flaps, flaperons, elevators, ailerons, rudders, or a combination thereof.

Said semi-rigid structure may comprise expandable mechanisms or flexible materials. Said expandable mechanisms and said flexible materials extend to a predetermined shape (e.g., protruding during take-off and landing when said leading-edge aerodynamic surface or said trailing-edge aerodynamic surface is deployed), but deform to their "flat" shapes when said leading-edge aerodynamic surface or said trailing-edge aerodynamic surface is retracted (e.g., remaining flush during high-speed flights). Alternatively, said semi-rigid structure may employ an inflatable assembly that expands to assume one or a plurality of blade-like shapes when the air pressure differential between the interior and the exterior of said inflatable assembly exceeds a predetermined level. For instance, higher interior air pressure is created by the deployment of said leading-edge aerodynamic surface or said trailing-edge aerodynamic surface (e.g., higher air pressure under said airfoil) expands said inflatable assembly outward to create a protruding shape.

A viable option is that in designs with slotted leading-edge aerodynamic surface or slotted trailing-edge aerodynamic surface, said means for vortex generation is positioned at a predetermined location inside (at least partially) the slot between said leading-edge aerodynamic surface and said airfoil or inside (at least partially) the slot between said trailing-edge aerodynamic surface and said airfoil. In this manner, said means for vortex generation is not exposed (i.e., inoperative) to said incoming air unless said leading-edge aerodynamic surface or said trailing-edge aerodynamic surface is deployed. Therefore, said means for vortex generation will not become operative and will not increase drag when said leading-edge aerodynamic surface or said trailing-edge aerodynamic surface is retracted.

Another viable option is to combine the options and the configurations discussed above and illustrated in the accompanying drawings into one application for better results, e.g., employing said means for vortex generation at said leading-edge aerodynamic surface as well as at said trailing-edge aerodynamic surface simultaneously. Or said pneumatic structure of air ejection nozzles is used approximately near the front of said airfoil and said mechanical structure of vanes is employed on said trailing-edge aerodynamic surface, or vis versa. Alternatively, a combination of said mechanical structure, said pneumatic structure, and said semi-rigid structure can be combined at one location.

It could be easily seen that this invention is not only applicable to airborne vehicles, but also can be used on land-based vehicles and ocean-going vehicles. High-performance land-based vehicles commonly employ airfoils to create downforce for increased grip onto the road surface. Various configurations of said airfoils have been used, including active spoilers or wings that can be moved up and down or tilted for different angles of attack according to the real-time driving conditions. Some of said spoilers or said wings comprises vortex generators to improve the aerodynamics. Certain high-performance cars have "non-moveable" vortex generators that are positioned near the rear windows. But none of said vortex generators is moveable or has any moveable part, even though said spoilers or said wings themselves can be moved up and down or tilted to different angles. The disadvantage of such configurations is that said vortex generators function all the time and constantly increase drag at the same time.

It is important to highlight that said leading-edge aerodynamic surface and said trailing-edge aerodynamic surface, two terms used extensively in this "Detailed Description of the Invention" section and in said claims listed below, are only two application examples, among many viable examples, applications, and embodiments, of this invention. Collectively, any aerodynamic surface approximately near the front of an airfoil, including leading-edge slats, and any aerodynamic surface approximately near the rear of an airfoil, including flaps, flaperons, elevators, ailerons, rudders, or a combination thereof, are suitable candidates for application and embodiment of this invention as well as fall within the realm of said claims listed below.

The main advantages offered by this invention include (1) simplicity in design and control, and (2) vortex generation on demand. In simple words, said means for vortex generation is simply an extended part of said leading-edge aerodynamic surface, said airfoil, or said trailing-edge aerodynamic surface, and does not have to require a separate control mechanism, even though said separate control mechanism could be employed. More significantly, said vortex generation on-demand is evidently manifested in that said means for vortex generation only becomes operative and hence increases drag when said leading-edge aerodynamic surface, said trailing-edge aerodynamic surface, or both are deployed. This is highly valuable and practically desirable, the reason being that, unlike the current vortex generators in use, said means for vortex generation does not impose any additional drag when vortex generation does not take place. In simple words, there is no penalty of increased drag when vortex generation is not needed, which makes this invention suitable not only for low-speed full-sized airplanes and radio-controlled airplanes, but also for high-speed full-sized airplanes and high-speed vehicles as well.

The foregoing description of my invention, including the accompanying drawings, is related only to some of the exemplary, preferred embodiments, and applications of this invention, while its true scope, as set forth in said claims listed below, is intended to include all possible or plausible applications, configurations, options, modifications, and embodiments, and is not limited to those of the examples, applications, configurations, options, embodiments, and functions described above. Similarly, said drawings shall be considered as illustrative in nature and shall not be interpreted to be as restrictive as graphically depicted, and the configurations, options, features, functionalities that are shown in said drawings or are described above can be combined in a design, application, or embodiment as needed.

I claim:

1. An apparatus for vortex generation to improve aerodynamics, comprising:
   a. an airfoil with a predetermined shape comprising at least one aerodynamic surface with a predetermined shape,
   b. said at least one aerodynamic surface being coupled onto said airfoil and being deployable,
   c. said at least one aerodynamic surface comprising a plurality of flexible or inflatable vanes for vortex generation, and
   d. said plurality of flexible or inflatable vanes being disposed at a predetermined location on said at least one aerodynamic surface and becoming exposed to a boundary-layer airflow and operative when said at least one aerodynamic surface is deployed.

2. The apparatus of claim 1 wherein the dimensions or shapes of said plurality of flexible or inflatable vanes are controllable according to at least one predetermined parameter.

3. The apparatus of claim 1 wherein said airfoil is further defined as belonging to the group of airfoils which includes an aircraft wing, an aircraft horizontal tail, an aircraft vertical tail, a rudder, a vehicle spoiler, a turbine blade, a fan blade, and a sail.

4. The apparatus of claim 1 wherein said at least one aerodynamic surface is further defined as belonging to the group of aerodynamic surfaces which includes a leading-edge slat, a trailing-edge flap, a slotted leading-edge slat, a slotted trailing-edge flap, a wing slat, a wing flap, a flaperon, an aileron, an elevator, an elevon, and a rudder.

5. The apparatus of claim 1 wherein the dimensions or shapes of said plurality of flexible or inflatable vanes are controllable by an air pressure differential between at least two predetermined areas.

6. The apparatus of claim 1 wherein said airfoil comprises a plurality of flexible or inflatable vanes for vortex generation, and said plurality of flexible or inflatable vanes are disposed at a predetermined location on said airfoil and become exposed to the boundary-layer airflow and operative when said at least one aerodynamic surface is deployed.

7. An apparatus for vortex generation to improve aerodynamics, comprising:
   a. an airfoil with a predetermined shape comprising at least one aerodynamic surface with a predetermined shape and further comprising a plurality of flexible or inflatable vanes for vortex generation,
   b. said at least one aerodynamic surface being coupled onto said airfoil and being deployable, and
   c. said plurality of flexible or inflatable vanes being disposed at a predetermined location on said airfoil and becoming exposed to a boundary-layer airflow and operative when said at least one aerodynamic surface is deployed.

8. The apparatus of claim 7 wherein the dimensions or shapes of said plurality of flexible or inflatable vanes are controllable according to at least one predetermined parameter.

9. The apparatus of claim 7 wherein said airfoil is further defined as belonging to the group of airfoils which includes an aircraft wing, an aircraft horizontal tail, an aircraft vertical tail, a rudder, a vehicle spoiler, a turbine blade, a fan blade, and a sail.

10. The apparatus of claim 7 wherein said at least one aerodynamic surface is further defined as belonging to the group of aerodynamic surfaces which includes a leading-edge slat, a trailing-edge flap, a slotted leading-edge slat, a slotted trailing-edge flap, a wing slat, a wing flap, a flaperon, an aileron, an elevator, an elevon, and a rudder.

11. The apparatus of claim 7 wherein the dimensions or shapes of said plurality of flexible or inflatable vanes are controllable by an air pressure differential between at least two predetermined areas.

12. The apparatus of claim 7 wherein said at least one aerodynamic surface comprises a plurality of flexible or inflatable vanes for vortex generation, and said plurality of flexible or inflatable vanes are disposed at a predetermined location on said at least one aerodynamic surface and become exposed to the boundary-layer airflow and operative when said at least one aerodynamic surface is deployed.

* * * * *